April 14, 1931. L. E. VARING 1,801,126
DRAFT EQUALIZER
Filed Nov. 5, 1928 2 Sheets-Sheet 1
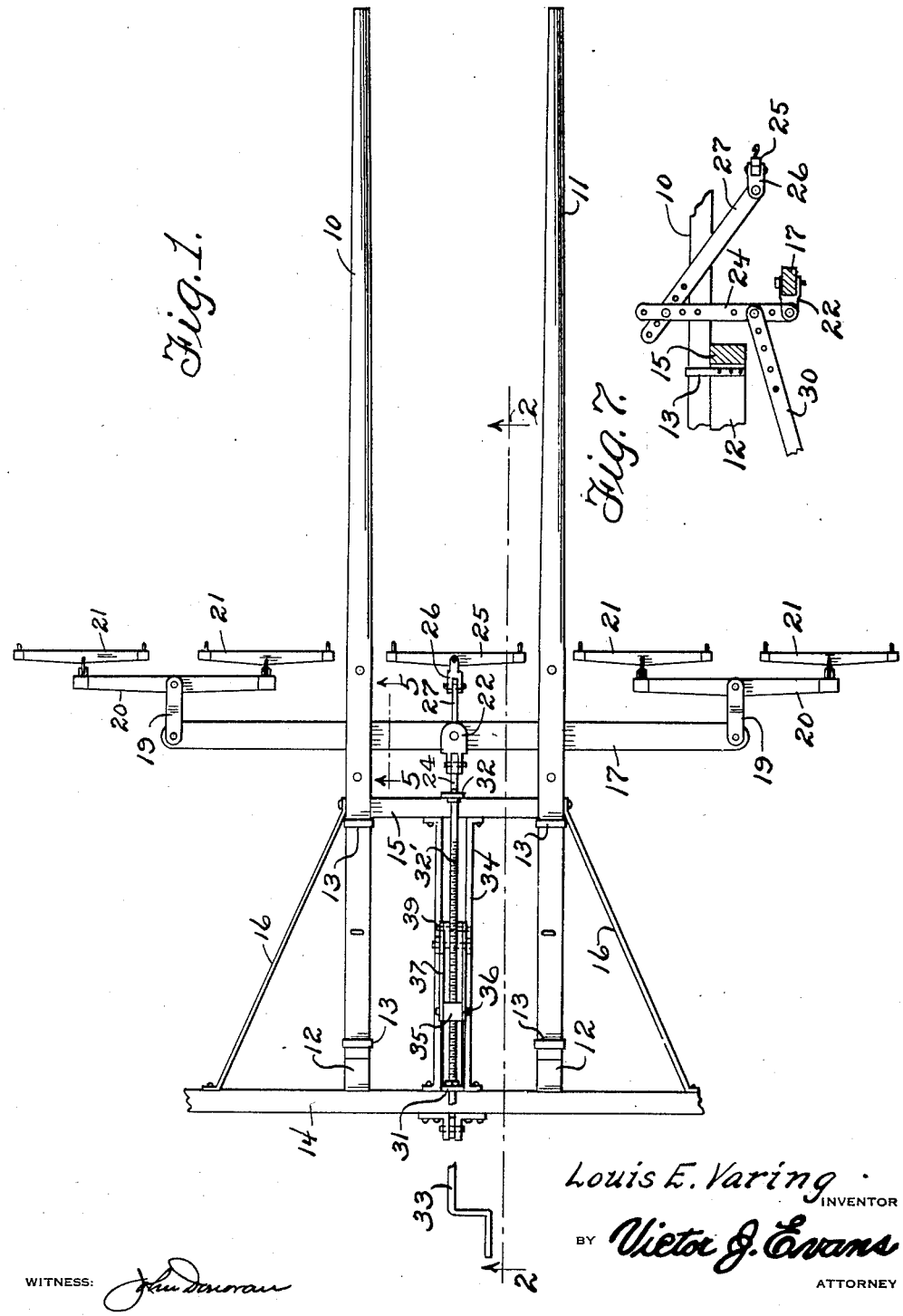

April 14, 1931.   L. E. VARING   1,801,126
DRAFT EQUALIZER
Filed Nov. 5, 1928   2 Sheets-Sheet 2
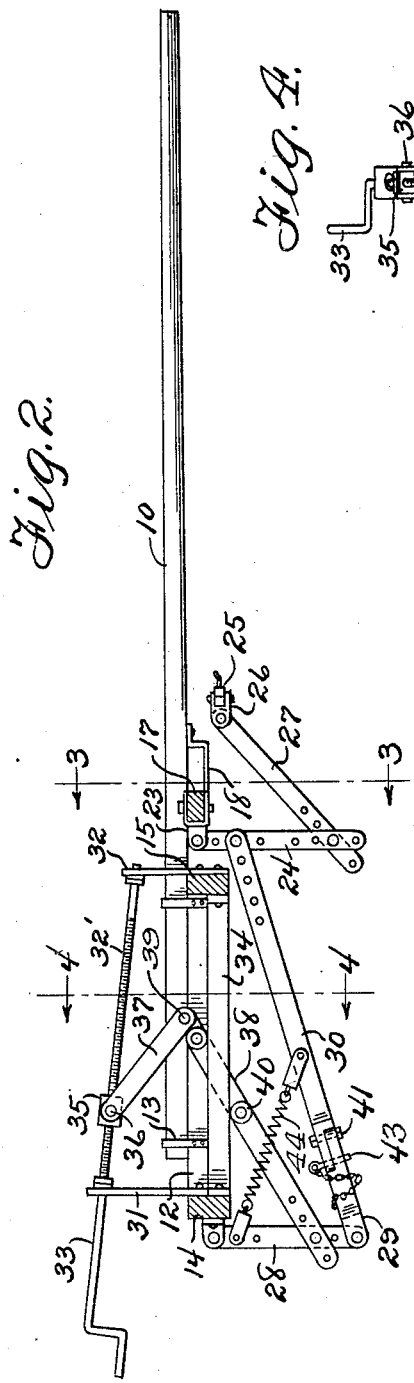
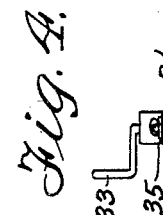
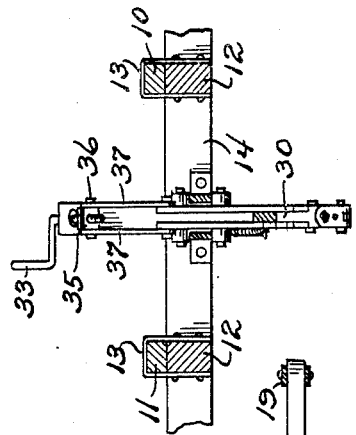
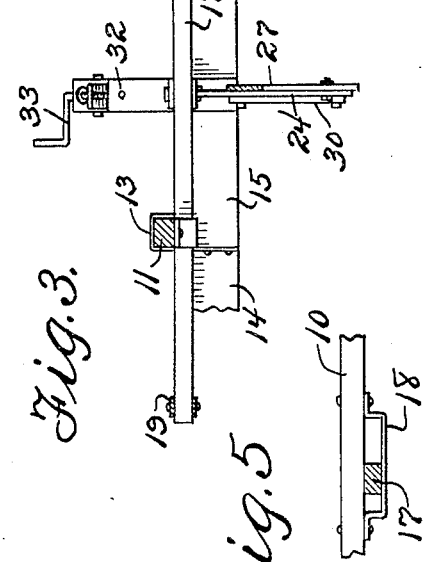
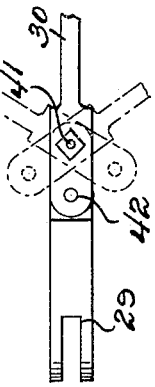

Patented Apr. 14, 1931

1,801,126

UNITED STATES PATENT OFFICE

LOUIS E. VARING, OF VOLIN, SOUTH DAKOTA

DRAFT EQUALIZER

Application filed November 5, 1928. Serial No. 317,330.

This invention relates to improvements in draft equalizing devices adapted for use upon wagons, agricultural implements and the like.

An object of the invention contemplates the provision of an automatic power pressure take off mechanism whereby the neck weight will be released from the draft animals.

Another object of the invention resides in the oblivion of spacing bars and brackets therefor between the tongues of the implement whereby a closer hitch and shorter draw bars may be facilitated as well as to lower the hitch.

An additional object of the invention contemplates an operating mechanism adapted to raise and lower the power take off mechanism.

In addition, the swinging draw bar permits working of the cultivator to the right or left and the equalizers stand still which lessens the friction on the draft animals' shoulders and necks.

With the above and other objects in view, the invention further consists of the following novel features and details of construction, to be hereinafter more fully described, illustrated in the accompanying drawings and pointed out in the appended claims.

In the drawings:—

Figure 1 is a top plan view of the invention.

Figure 2 is a longitudinal sectional view taken on line 2—2 of Figure 1.

Figure 3 is a vertical sectional view taken on line 3—3 of Figure 2.

Figure 4 is a vertical sectional view taken on line 4—4 of Figure 2.

Figure 5 is a horizontal sectional view taken through the equalizer bar in Figure 1 of the drawings, on line 5—5 thereof, and illustrating the mounting of the bar upon the tongues.

Figure 6 is a fragmentary top plan view of the connecting link and a flexible connection for the sections therefor.

Figure 7 is a fragmentary sectional view taken through the cultivator with the fifth horse single tree and equalizer bar reversed.

Referring to the drawings in detail, wherein like characters of reference denote corresponding parts, the reference characters 10 and 11 indicate tongues disposed in parallelism and having their innermost ends supported upon the upper sides of stub tongue brackets 12 through the instrumentality of brackets 13. The latter being adapted for connection with an axle 14 of a wagon or agricultural implement. A transverse bar 15, carried upon the foremost ends of the stub tongue brackets 12, is located immediately beneath and reposing against the undersides of the tongues 10 and 11 in the manner as best illustrated in Figure 2 of the drawings.

Braces 16, establishing the means of connection between the outer sides of the tongues 10 and 11 and forward sides of the axle 14, are adapted to prevent displacement and weaving action between the innermost ends of the tongues and stub tongue brackets 12 therefor. An equalizer bar 17, mounted for both longitudinal sliding and rocking movement within guide plates 18 carried upon the undersides of the tongues 10 and 11, is adapted for connection at its outermost ends with clevis members 19 pivotally connected at their forward ends to intermediate points in the lengths of whiffle-trees 20 supporting single trees 21 upon the ends thereof.

A clevis 22, having connection with the intermediate point in the length of the equalizer bar 17, is provided with a bifurcated portion 23 upon the inner side thereof and adapted for pivotal connection with the uppermost projecting end of a plate member 24.

Likewise a single tree 25, arranged between the tongues 10 and 11 in line with the single trees 21 upon the whiffle-trees 20 and in advance of the equalizer bar 17, is provided with a clevis 26 in turn pivotally connected with a link 27. The adjacent ends of the plate 24 and link 27 are associated through the instrumentality of a pin and slot connection. A link 28, pivotally mounted upon the axle 14, is adapted for connection at its lowermost end with the bifurcated extremity 29 of a connecting link 30 secured at its opposite end to the plate 24, substantially as illustrated in Figure 2 of the drawings.

Bearing plates 31 and 32, carried by and upstanding from the axle 14 and transverse beam 15 between the tongues 10 and 11 and the stub tongue brackets 12 therefor, are adapted to journal the adjacent ends of a threaded crank arm 33.

Braces or pressure beams 34 being adapted to establish the means of connection between the axle and transverse bar 15 to prevent displacement of the crank arm. A block 35, mounted for traveling movement upon the crank arm 33, is provided with laterally projecting trunnions 36 upon the opposite sides thereof and adapted for connection with the adjacent ends of connecting rods 37.

Drag links or pressure arms 38, having connection at their lowermost ends with the opposite sides of the link 28, are extended between the braces 34 for connection with a common pivot 39 within the lowermost ends of the connecting rods 37. Rollers 40, carried by each of the drag links 38, are adapted for engagement with the upper and lower side edges of the braces 34 whereby ease in the sliding of the drag links 38 in conjunction with the connecting rods 37 operable by the block 35 will be facilitated.

As shown in Figures 2 and 6 of the drawings, the connecting link or draw bar 30 is of sectional formation and including a pivot connection 41 at the points of intersection of a half together joint.

The jointed extremities of the connecting link sections are furthermore provided with registering openings 42 to accommodate a pin member 43 whereby the normal rigidity of the connecting link may be maintained.

A spring element 44 is adapted to establish the means of connection between the links 28 and 30 and which will yieldingly retain the sections of the connecting link in its respective lateral positions whereby friction will be relieved from the necks and shoulders of draft animals.

The drag links or pressure arms 38 puts or otherwise exercises the pressure upon the braces or pressure beams 34 from underneath and the harder the pull on the draw bar or connecting link 30 the more pressure the arms 38 will transmit to the beams 34 from underneath. By changing the position of the crank arm 33, which changes or shifts the pressure arms 38 forward and backward on the pressure beams 34, it also changes the pressure whereby the end of the tongue will be balanced properly. As noted, the pressure arms 38 are adjusted up and down on the back lever arm 28 and has a greater pressure when said ends are lowered. The cardinal purpose of the power pressure take off is to keep the pressure up on the cultivator and to take the weight off the end of the tongues or tongue trucks and the draft animal's necks and shoulders and to hold the implement steady by the pressure from the arms 38 on the pressure beams 34 and also raise and lower the hitch. The main object of the swinging draw bar 30 is to permit the equalizer to stand still and allow the implement to work to the right or left which relieves side draft and takes the friction off of the animals' necks and shoulders when the pin 43 is removed.

The invention is susceptible of various changes in its form, proportions and minor details of construction, and the right is herein reserved to make such changes as properly fall within the scope of the appended claims.

Having thus described the invention, what is claimed is—

1. A draft equalizer comprising an axle, tongues having guides longitudinally disposed and horizontally aligned upon the under sides thereof, an equalizer bar rockingly and slidably mounted between the tongues and guides, pressure beams establishing connection between the axle and tongues, a plate member having clevis connection with the intermediate portion of the equalizer bar, a link pivotally connected with and depending from said axle, a connecting link having pivotal connection at one end with the depending extremity of the link and eccentric pivot connection with the plate member, pressure arms having eccentric pivotal connection with the link and slidable connection with the pressure beams, and a single tree operatively connected with the depending portion of the plate member.

2. A draft equalizer comprising an axle, tongues having guides longitudinally disposed and horizontally aligned upon the under sides thereof, an equalizer bar rockingly and slidably mounted between the tongues and guides, pressure beams establishing connection between the axle and tongues, a plate member having clevis connection with the intermediate portion of the equalizer bar, a link pivotally connected with and depending from said axle, a connecting link having pivotal connection at one end with the depending extremity of the link and eccentric pivot connection with the plate member, pressure arms having eccentric pivotal connection with the link and slidable connection with the pressure beams, a manually operated crank arm carried by the axle having adjustable connection with the pressure arms, and a single tree having operative connection with the depending end of the plate member.

3. A draft equalizer comprising an axle, tongues having guides longitudinally disposed and horizontally aligned upon the under sides thereof, an equalizer bar rockingly and slidably mounted between the tongues and guides, pressure beams establishing connection between the axle and tongues, a plate member having clevis connection with the intermediate portion of the equalizer bar, a link pivotally connected with and depending from said axle, a connecting link composed of swingably connected sections having pivotal connection at one end with the depending extremity of the link and eccentric pivotal connection with the plate member, pressure arms having eccentric pivotal connection with the link and slidable connection with the pressure beams, and a single tree operatively connected with the depending portion of the plate member.

In testimony whereof I affix my signature.

LOUIS E. VARING.